United States Patent
Ritter et al.

(10) Patent No.: US 10,281,049 B2
(45) Date of Patent: May 7, 2019

(54) VALVE ASSEMBLY

(71) Applicant: Kohler Co., Kohler, WI (US)

(72) Inventors: David H. Ritter, Kohler, WI (US); Brian S. Core, Fond du Lac, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 15/414,878

(22) Filed: Jan. 25, 2017

(65) Prior Publication Data

US 2017/0211711 A1    Jul. 27, 2017

Related U.S. Application Data

(60) Provisional application No. 62/287,220, filed on Jan. 26, 2016.

(51) Int. Cl.
*E03C 1/04* (2006.01)
*F16K 11/074* (2006.01)
*F16K 31/60* (2006.01)
*F16K 11/22* (2006.01)

(52) U.S. Cl.
CPC ............ *F16K 11/0743* (2013.01); *E03C 1/04* (2013.01); *F16K 11/22* (2013.01); *F16K 31/602* (2013.01); *Y10T 137/6017* (2015.04)

(58) Field of Classification Search
CPC ...... F16K 11/22; F16K 31/602; E03C 1/0412; Y10T 137/6017
See application file for complete search history.

(56) References Cited

U.S. PATENT DOCUMENTS

| | | | |
|---|---|---|---|
| 3,780,758 A | 12/1973 | DeVries | |
| 4,425,935 A | 1/1984 | Gonzalez | |
| 4,493,338 A | 1/1985 | Petursson | |
| 5,010,917 A * | 4/1991 | Iqbal | F16K 3/08 137/454.6 |
| 5,918,626 A | 7/1999 | Strong et al. | |
| 6,095,494 A | 8/2000 | Eagle | |
| 6,247,496 B1 | 6/2001 | Ko | |
| 6,634,380 B2 * | 10/2003 | Bartkus | F16K 11/0743 137/625.46 |
| 6,904,936 B2 * | 6/2005 | Ma | F16K 11/076 137/625.11 |
| 6,908,071 B2 * | 6/2005 | Roethel | F16K 3/265 251/238 |

(Continued)

FOREIGN PATENT DOCUMENTS

| | | |
|---|---|---|
| CN | 103486301 A | 1/2014 |
| CN | 103498951 | 1/2014 |

(Continued)

*Primary Examiner* — Craig M Schneider
*Assistant Examiner* — Kevin R Barss
(74) *Attorney, Agent, or Firm* — Foley & Lardner LLP

(57) ABSTRACT

A fluid control valve includes a body, a stem, a moveable disc, a stationary disc, and a valve seal. The stem is rotatably coupled to the body, and is configured to freely rotate three hundred and sixty degrees relative to the body. The moveable disc is coupled to the stem, and is configured to rotate with the stem. The stationary disc is coupled to the body below the moveable disc. The valve seal is coupled to the body below the stationary disc, and is reversible such that the valve seal is configured to be coupled to the body in at least two different orientations.

20 Claims, 14 Drawing Sheets

(56) References Cited

U.S. PATENT DOCUMENTS

| | | | | |
|---|---|---|---|---|
| 6,941,968 B2* | 9/2005 | Vidal | ............ | B01D 35/04 |
| | | | | 137/544 |
| 7,004,197 B2* | 2/2006 | Gilbert | ............ | F16K 3/08 |
| | | | | 137/625.31 |
| 7,143,786 B2* | 12/2006 | Romero | ............ | F16K 3/08 |
| | | | | 137/606 |
| 7,261,117 B2* | 8/2007 | Mork | ............ | F16K 11/0743 |
| | | | | 137/1 |
| 7,331,359 B2* | 2/2008 | Shay | ............ | F16K 3/08 |
| | | | | 137/454.2 |
| 7,487,797 B2* | 2/2009 | Di Nunzio | ............ | F16K 11/0787 |
| | | | | 137/625.17 |
| 7,556,061 B2* | 7/2009 | Morita | ............ | E03C 1/04 |
| | | | | 137/625.17 |
| 7,779,865 B2* | 8/2010 | Shay | ............ | F16K 3/04 |
| | | | | 137/454.6 |
| 8,297,305 B2* | 10/2012 | Ritter | ............ | E03C 1/0403 |
| | | | | 137/454.2 |
| 8,453,669 B2 | 6/2013 | Veros et al. | | |
| 8,459,302 B2* | 6/2013 | Pederson | ............ | F16K 11/074 |
| | | | | 137/625.15 |
| 8,695,638 B2* | 4/2014 | DiNunzio | ............ | F16K 11/078 |
| | | | | 137/625.41 |
| 8,714,198 B1 | 5/2014 | Chen et al. | | |
| 8,739,813 B2 | 6/2014 | Moore et al. | | |
| 8,800,962 B2* | 8/2014 | Ritter | ............ | E03C 1/0403 |
| | | | | 137/625.31 |
| 8,881,755 B2 | 11/2014 | Thomas et al. | | |
| 9,657,861 B2* | 5/2017 | Enomoto | ............ | F16K 11/22 |
| 2012/0067978 A1 | 3/2012 | Leichty et al. | | |
| 2012/0273075 A1 | 11/2012 | Pitsch et al. | | |
| 2013/0186482 A1 | 7/2013 | Veros et al. | | |
| 2014/0060686 A1* | 3/2014 | Kemp | ............ | F16K 3/08 |
| | | | | 137/625.17 |
| 2014/0261747 A1 | 9/2014 | Bares et al. | | |

FOREIGN PATENT DOCUMENTS

| | | |
|---|---|---|
| CN | 104105911 | 10/2014 |
| CN | 103148229 A | 8/2016 |
| DE | 27 15 218 A1 | 10/1977 |
| DE | 89 09 346 U1 | 11/1989 |
| EP | 1 039 186 A2 | 9/2009 |
| EP | 2 557 241 A1 | 8/2011 |
| ES | 2002359 A6 | 3/1991 |
| FR | 2532392 A1 | 3/1984 |
| GB | 1 142 389 | 2/1969 |
| KR | 10-1114839 B1 | 3/2012 |
| WO | WO-88/10386 A1 | 12/1988 |
| WO | WO-93/02305 A1 | 2/1993 |
| WO | WO-2008/031431 A1 | 3/2008 |

* cited by examiner

VALVE ASSEMBLY

CROSS-REFERENCE TO RELATED PATENT APPLICATIONS

This application claims the benefit of and priority to U.S. Provisional Application No. 62/287,220, filed Jan. 26, 2016, the entire disclosure of which is hereby incorporated by reference herein.

BACKGROUND

The present application relates generally to faucet assemblies. In particular, this application relates to fluid control valves for use in faucet assemblies.

Generally speaking, widespread and centerset faucet assemblies typically include two separate and distinct fluid control valves associated with a hot water source and a cold water source, respectively. The fluid control valves can be a fluid mixing valve to control the amount of water delivered to a user from the two different water sources. A handle assembly coupled to the valve may be articulated by a user to allow the user to control the temperature and flow rate of a flow of water exiting the faucet assembly. The separate valves can be joined together by a connecting member sometimes referred to as a waterway connector, which can facilitate mixing of hot and cold water from the different water sources. A spout or fluid conduit can extend from the waterway to deliver mixed water to the user.

SUMMARY

It would be advantageous to have a single, common fluid control valve that can be used for either the hot water source or the cold water source, so as to reduce the complexity of the faucet assembly and reduce manufacturing costs. These and other advantageous features will become apparent to those reviewing the present disclosure and claims.

One embodiment relates to a fluid control valve for a faucet. The fluid control valve includes a body, a stem, a moveable disc, a stationary disc, and a valve seal. The stem is rotatably coupled to the body, and is configured to freely rotate three hundred and sixty degrees relative to the body. The moveable disc is coupled to the stem, and is configured to rotate with the stem. The stationary disc is coupled to the body below the moveable disc. The valve seal is coupled to the body below the stationary disc, and is reversible such that the valve seal is configured to be coupled to the body in at least two different orientations.

Another embodiment relates to a faucet assembly including a body, a stem, a moveable disc, a first stationary disc, and a second stationary disc. The stem is rotatably coupled to the body, and is configured to freely rotate three hundred and sixty degrees relative to the body. The moveable disc is coupled to the stem, and is configured to rotate with the stem. The first stationary disc is coupled to the body below the moveable disc. The second stationary disc is coupled to the body below the first stationary disc. The first and second stationary discs are fixed relative to the body. The fluid control valve is configured to be biased in an axial direction within a valve body by an incoming supply of fluid through the first stationary disc and the second stationary disc.

Another embodiment relates to a faucet assembly including a body, a stem, a moveable disc, a stationary disc, and a valve seal. The stem is rotatably coupled to the body, and is configured to freely rotate three hundred and sixty degrees relative to the body. The moveable disc is coupled to the stem, and is configured to rotate with the stem. The stationary disc is coupled to the body below the moveable disc. The valve seal is coupled to the body below the stationary disc, and is reversible such that the valve seal is configured to be coupled to the body in at least two different orientations. The stem includes a protrusion, and the moveable disc includes a receiving channel configured to receive the protrusion such that rotation of the stem results in corresponding rotation of the moveable disc.

It is to be understood that both the foregoing general description and the following detailed description are exemplary and explanatory only, and are not restrictive of the invention as claimed.

DETAILED DESCRIPTION

Figure 1:
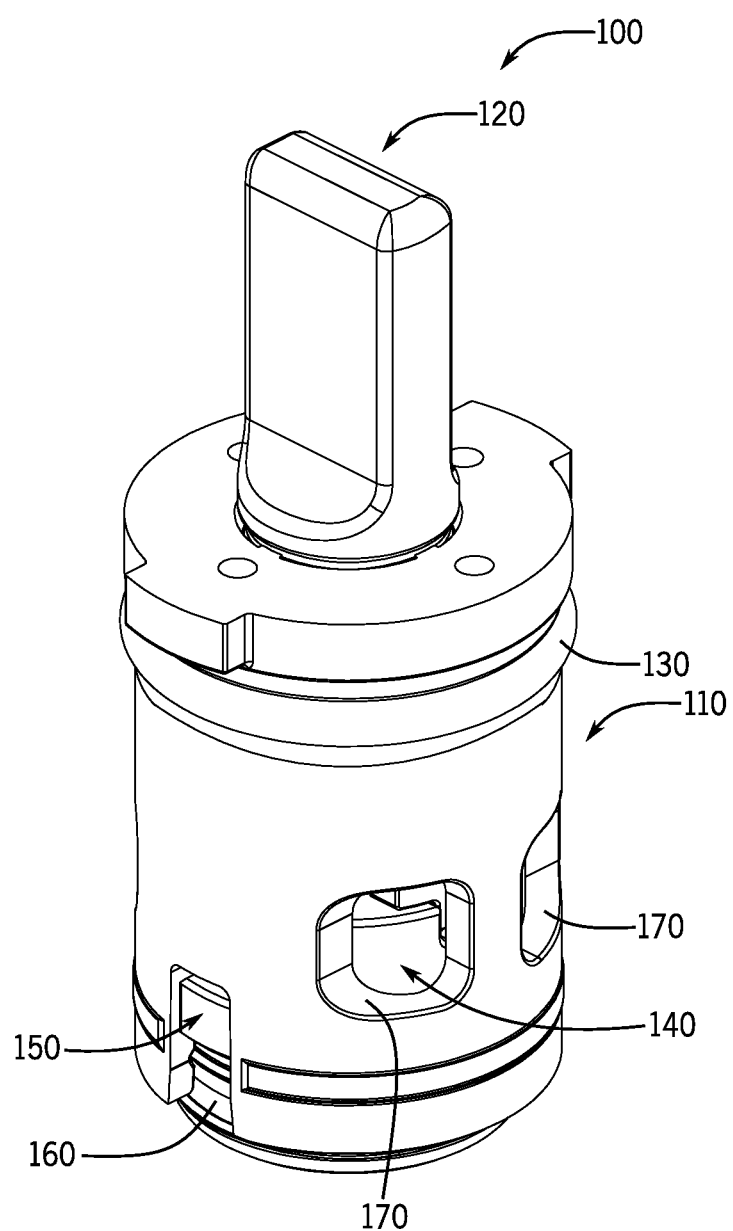
FIG. 1 is a perspective view of a valve for a faucet assembly, according to an exemplary embodiment of the present disclosure.
Figure 2:
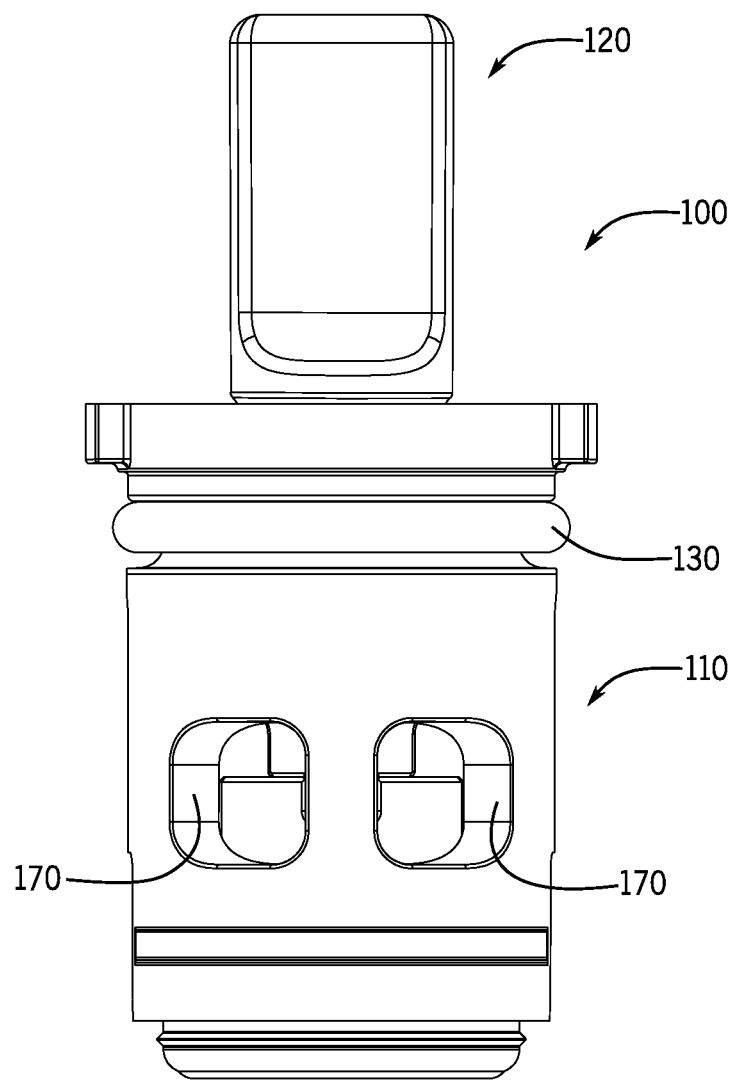
FIG. 2 is another perspective view of the valve shown in FIG. 1.

Before turning to the figures, which illustrate the exemplary embodiments in detail, it should be understood that the present application is not limited to the details or methodology set forth in the description or illustrated in the figures.

It should also be understood that the terminology is for the purpose of description only and should not be regarded as limiting.

Referring to FIGS. 1-4, a fluid control valve (e.g., valve, valve cartridge, fluid mixing valve, etc.), shown as centerset valve 100, for controlling a supply of water within a faucet assembly is shown according to an exemplary embodiment. According to the exemplary embodiment shown, centerset valve 100 includes a body (e.g., valve body, etc.), shown as body 110, a stem (e.g., valve stem, etc.), shown as stem 120, a seal, shown as seal 130, a disc (e.g., metering disc, etc.), shown as moveable disc 140, another disc (e.g., metering disc, etc.), shown as stationary disc 150, and a seal, shown as reversible valve seal 160. Reversible valve seal 160 may be reversible such that it may be installed in either an up or a down orientation (i.e., at least two different orientations) relative to an annular surface of reversible valve seal 160. Reversible valve seal 160 may therefore increase speed and ease of assembly of centerset valve 100. Additionally, reversible valve seal 160 may facilitate servicing operations such that centerset valve 100 may be serviced in a more simplified manner than a typical valve. In some embodiments, centerset valve 100 is a quarter-turn valve (i.e., a rotation of ninety-degrees fully articulates centerset valve 100 from an open position to a closed position). Stem 120 may include a protrusion, shown as tab 300, configured to interact with a receiving feature, shown as channel 310, contained within moveable disc 140, such that rotation of stem 120 results in corresponding rotation of moveable disc 140. In other words, stem 120 is rotatably coupled to moveable disc 140. Stationary disc 150 may include one or more features, shown as tabs 320, configured to interact with slots in body 110 such that rotation of stem 120 does not result in rotation of stationary disc 150. Stationary disc 150 may include one or more holes, shown as apertures 330. Stationary disc 150 may be disposed below moveable disc 140.

The angular spacing of the holes included on stationary disc 150 determines the amount of rotation necessary to achieve a full supply of water through centerset valve 100. In one embodiment where centerset valve 100 is a quarter-turn valve, apertures 330 on stationary disc 150 are angularly spaced one-hundred and eighty degrees apart (i.e., diametrically opposed). In application, the rotation of stem 120, and thereby moveable disc 140, results in a supply of water through apertures 330 on stationary disc 150, through gaps between moveable disc 140 and an inner portion of body 110, and out of the apertures, shown as apertures 170, of body 110. The gaps in moveable disc 140 and apertures 330 on stationary disc 150 are configured to meter the supply of water within centerset valve 100. According to an exemplary embodiment, centerset valve 100 is used to control (e.g., meter, etc.) either a hot water source or a cold water source. In this manner, centerset valve 100 can simplify the assembly process of a faucet assembly and can reduce manufacturing costs by eliminating the need for distinct valves for a hot and a cold water supply. In some embodiments, centerset valve 100 is a side discharge valve.

According to various exemplary embodiments, centerset valve 100 does not include integrated stop features to control the travel of stem 120 within centerset valve 100. Instead, centerset valve 100 may utilize stop features included within other components of a faucet assembly, such as the yoke, body, handle adaptor, handle, or other suitable component of the faucet assembly such that centerset valve 100 may be tailored for a target application. In this manner, when centerset valve 100 is uninstalled from the faucet assembly, stem 120 may rotate freely three-hundred and sixty degrees relative to the body. However, when installed in the faucet assembly, stem 120 may rotate between the end stops integrated within the faucet assembly, which can be angularly spaced a specific angular distance to provide a desired angular travel. In one embodiment, the end stops are molded into the yoke of the faucet assembly.

Body 110, seal 130, moveable disc 140, stationary disc 150, and reversible valve seal 160 may be constructed of various materials or combinations of materials, such as brass, aluminum, polymeric material, thermoset, polymeric based blend, polymer, nylon, rubber, synthetic rubber, polyvinyl chloride, polytetrafluoroethylene, ceramic, ceramic blend, ceramic-metallic blend, alumina, metallic blend, zinc, alloy, brass, aluminum, steel, or any other suitable material such that centerset valve 100 may be tailored for a target application. Further, body 110, stem 120, seal 130, moveable disc 140, stationary disc 150, and reversible valve seal 160 may have various surface finishes, porosities, grain sizes, intergranular phase and chemical properties, purities, wear resistance, shock resistance, flatness, surface roughness, bear ratios, have rounded or corned edges, or any other suitable properties such that centerset valve 100 may be tailored for a target application.

In an exemplary embodiment, stem 120 is constructed of a plastic material such as a polymeric material, thermoset, polymeric based blend, polymer, nylon, rubber, synthetic rubber, polyvinyl chloride, polytetrafluoroethylene, or any other suitable plastic material such that centerset valve 100 may be tailored for a target application. However, in alternative embodiments, stem 120 is constructed of brass, metallic blend, zinc alloy, aluminum, steel, or any other suitable material such that centerset valve 100 may be tailored for a target application.

Figure 3:
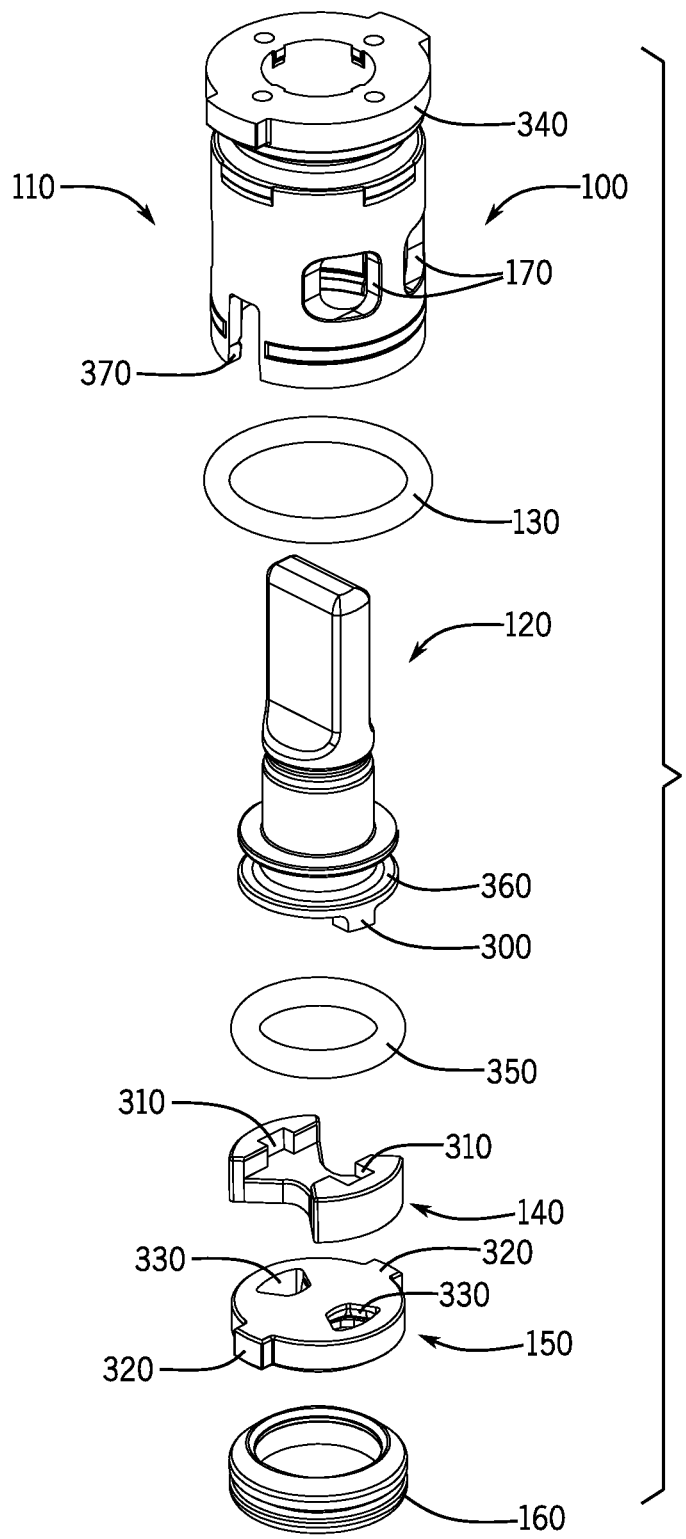
FIG. 3 is a perspective exploded view of the valve shown in FIG. 1.
Figure 4:
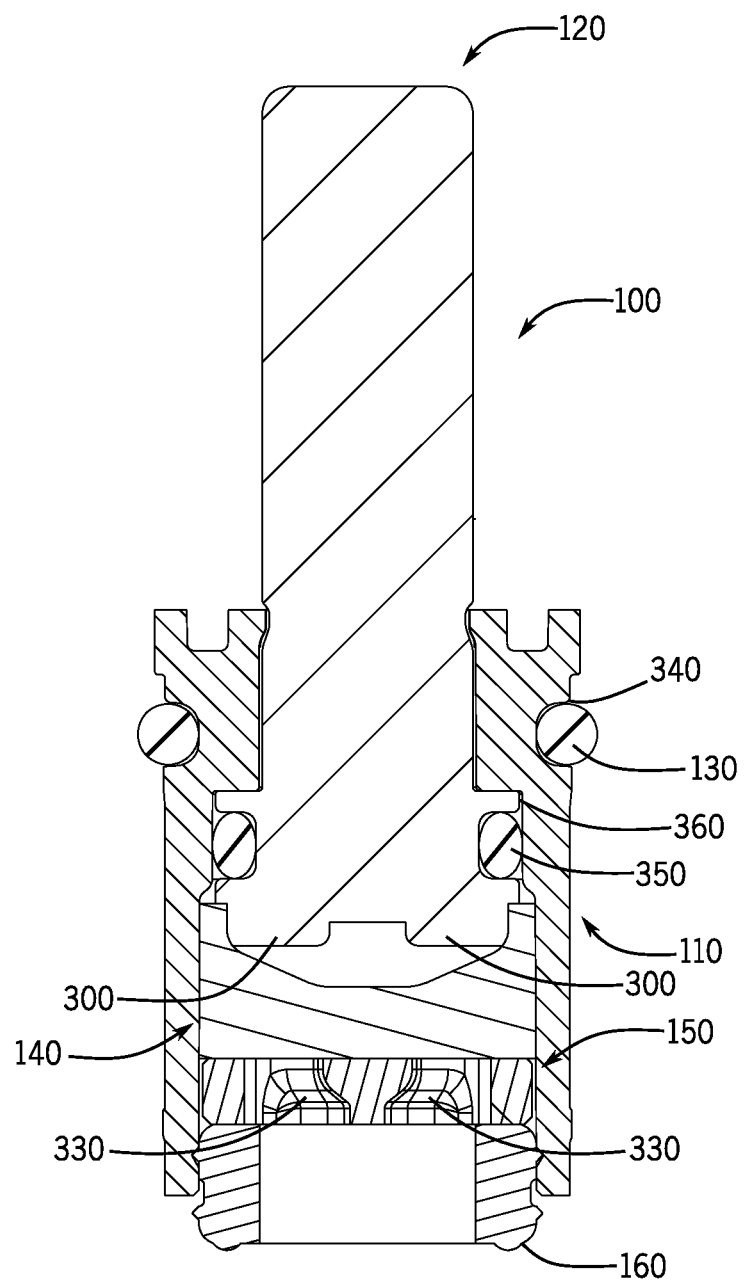
FIG. 4 is a cross-sectional view of the valve shown in FIG. 1.

FIG. 3 illustrates a perspective exploded view of centerset valve 100 according to an exemplary embodiment. According to the exemplary embodiment shown, body 110 includes a channel, shown as channel 340, which is configured to receive seal 130 therein along an outer portion of the body. Channel 340 may prevent displacement of seal 130 when installing centerset valve 100 within the faucet assembly. According to an exemplary embodiment, centerset valve 100 includes a seal, shown as seal 350, and stem 120 may include a channel, shown as channel 360, configured to receive seal 350 therein. As shown in FIG. 4, seal 350 may provide a seal between stem 120 and an inner portion of body 110. FIG. 4 illustrates an example where centerset valve 100 has been configured to prohibit the flow of a supply of water through centerset valve 100. In operation, moveable disc 140 is operable between an open position and a closed position. In the open position, a fluid pathway exists from reversible valve seal 160 through stationary disc 150, moveable disc 140, and out through apertures 170. In the closed position, the fluid pathway is blocked by moveable disc 140 at the openings in stationary disc 150 and at apertures 170. Centerset valve 100 may have a fluid inlet through reversible valve seal 160, stationary disc 150, and moveable disc 140, and a fluid outlet through moveable disc 140 and aperture 170 of body 110. According to various embodiments, body 110 includes a channel or opening, shown as slot 370, configured to receive tabs 320 therein. Slot 370 may retain tabs 320 therein, thereby limiting or preventing movement of stationary disc 150 relative to body 110. In some embodiments, body 110 includes the same number of slots 370 as tabs 320. According to various embodiments, the angular positions of slots 370 corresponds to the angular positions of tabs 320. In one embodiment, centerset valve 100 includes body 110 having at least two slots 370 separated by an angular distance of one-hundred and eighty degrees and a stationary disc 150 having at least two tabs 320 separated by an angular distance of one-hundred and eighty degrees.

According to an exemplary embodiment, seal 130 and/or seal 350 is an O-ring (e.g., packing, toric joint, gasket, spacer, loop, seal, etc.), which may be constructed out of any suitable material including, for example, nitrile, Buna-N nitrile, nitrile butadiene rubber (NBR), perfluoroelastomer (FFKM), vinylidene fluoride and hexafluoropropylene (Viton®), fluoroelastomer (FKM), fluorocarbon, silicone, tetrafluoroethylene (TFE), Neoprene®, fluorinated ethylene propylene (FEP), polytetrafluoroethylene (PTFE) (Teflon®), perfluoroalkoxy alkane (PFA), or other suitable materials such that seal 130 and/or seal 350 may be tailored for a target application.

Figure 5:
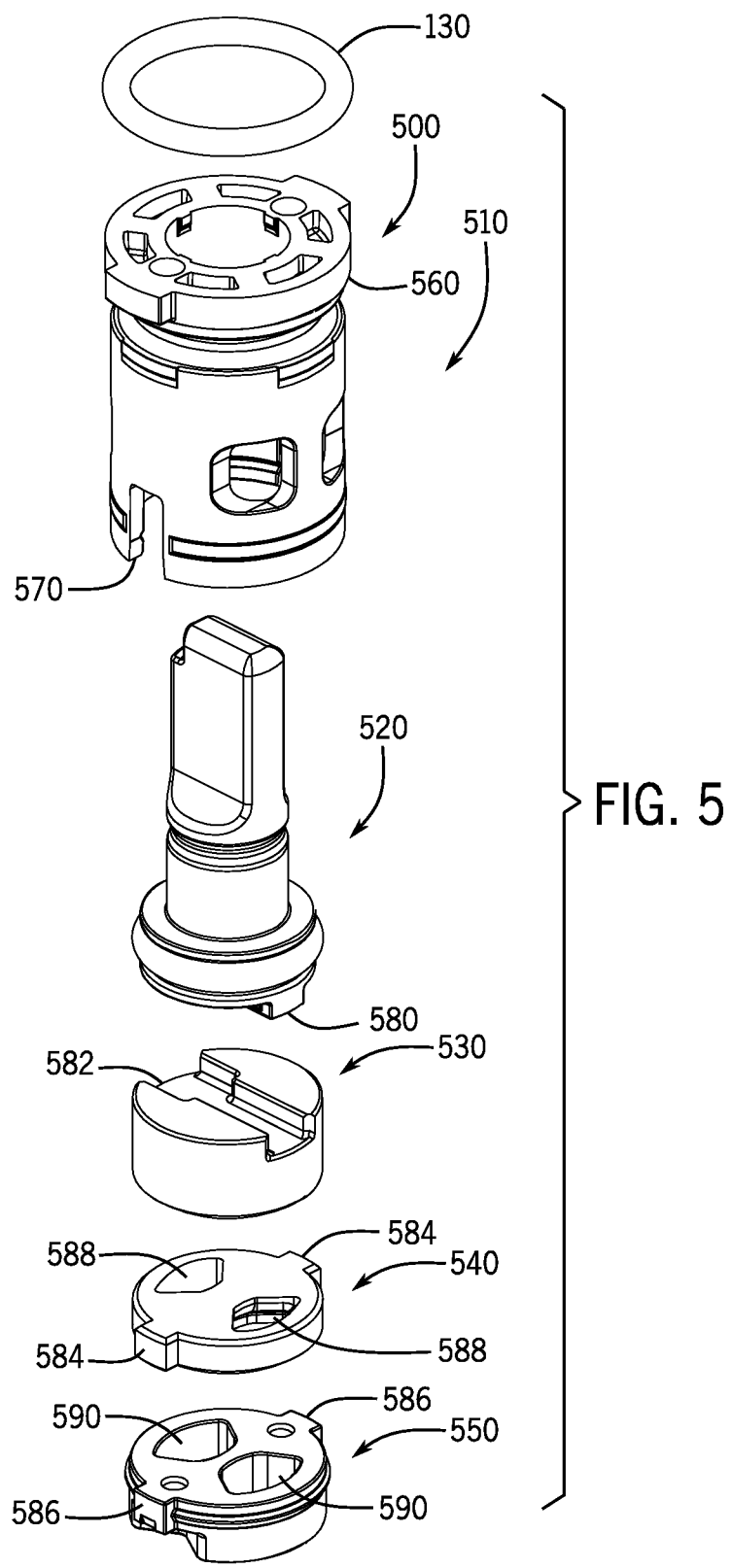
FIG. 5 is a perspective exploded view of another valve for a faucet assembly, according to another exemplary embodiment of the present disclosure.

FIG. 5 illustrates a fluid control valve (e.g., valve, valve cartridge, fluid mixing valve, etc.), shown as widespread valve 500, for use for controlling a supply of water within a faucet assembly according to another exemplary embodiment. According to the embodiment shown, widespread valve 500 is structurally and/or functionally different from centerset valve 100. However, both centerset valve 100 and widespread valve 500 are designed such that either valve may be used as either a hot water supply or a cold water supply valve. In this manner, centerset valve 100 and widespread valve 500 minimize the complexity of the faucet assembly and reduce manufacturing costs by eliminating the need for separate and distinct valves for hot and cold water supplies.

In the embodiment shown in FIG. 5, widespread valve 500 includes a body (e.g., valve body, etc.), shown as body 510, a stem (e.g., valve stem, etc.), shown as stem 520, a disc (e.g., metering disc, etc.), shown as moveable disc 530, another disc (e.g., metering disc, etc.), shown as first stationary disc 540, and yet another disc (e.g., metering disc, etc.), shown as second stationary disc 550. Body 510 may include a channel, shown as channel 560, configured to receive seal 130, and one or more slots, shown as slots 570. Stem 520 may include one or more protrusions, shown as tabs 580. Moveable disc 530 may include a channel, shown as channel 582, configured to interact with tabs 580, such that rotation of stem 520 is transferred to moveable disc 530 from tabs 580 through channel 582. According to various embodiments, moveable disc 530 is structurally and/or functionally different from moveable disc 140. First stationary disc 540 may include one or more protrusions, shown as tabs 584, configured to interact with slot 570, such that rotation of stem 520 does not translate to rotation of first stationary disc 540. Second stationary disc 550 may include one or more protrusions, shown as tabs 586, configured to interact with slot 570 such that rotation of stem 520 does not translate to rotation of second stationary disc 550. Tabs 584 and 586 may be substantially aligned when first stationary disc 540 and second stationary disc 550 are installed within body 510 and slot 570. First stationary disc 540 may include one or more holes, shown as apertures 588. Second stationary disc 550 may include one or more holes, shown as apertures 590. Apertures 588 and apertures 590 may be substantially aligned when first stationary disc 540 and second stationary disc 550 are installed within body 510 and slot 570.

According to an exemplary embodiment, widespread valve 500 is a bottom discharge valve. Widespread valve 500 may have a fluid inlet through second stationary disc 550, first stationary disc 540, and moveable disc 530, and may have a fluid outlet through second stationary disc 550, first stationary disc 540, and moveable disc 530. In other words, a supply of water may be received and transmitted in opposing directions one-hundred and eighty degrees apart. In some applications, a bottom discharge valve, such as widespread valve 500, is advantageous because it provides a fluid connection for some widespread faucet plumbing constructions. In some embodiments, widespread valve 500 is a dry stem valve.

In operation, rotation of stem 520 may result in rotation of moveable disc 530. In other words, stem 520 is rotatably coupled to moveable disc 530. Moveable disc 530 is operable between an open position, where a supply of water is facilitated through widespread valve 500, and a closed position, where the supply of water is prohibited through widespread valve 500.

Figure 6:
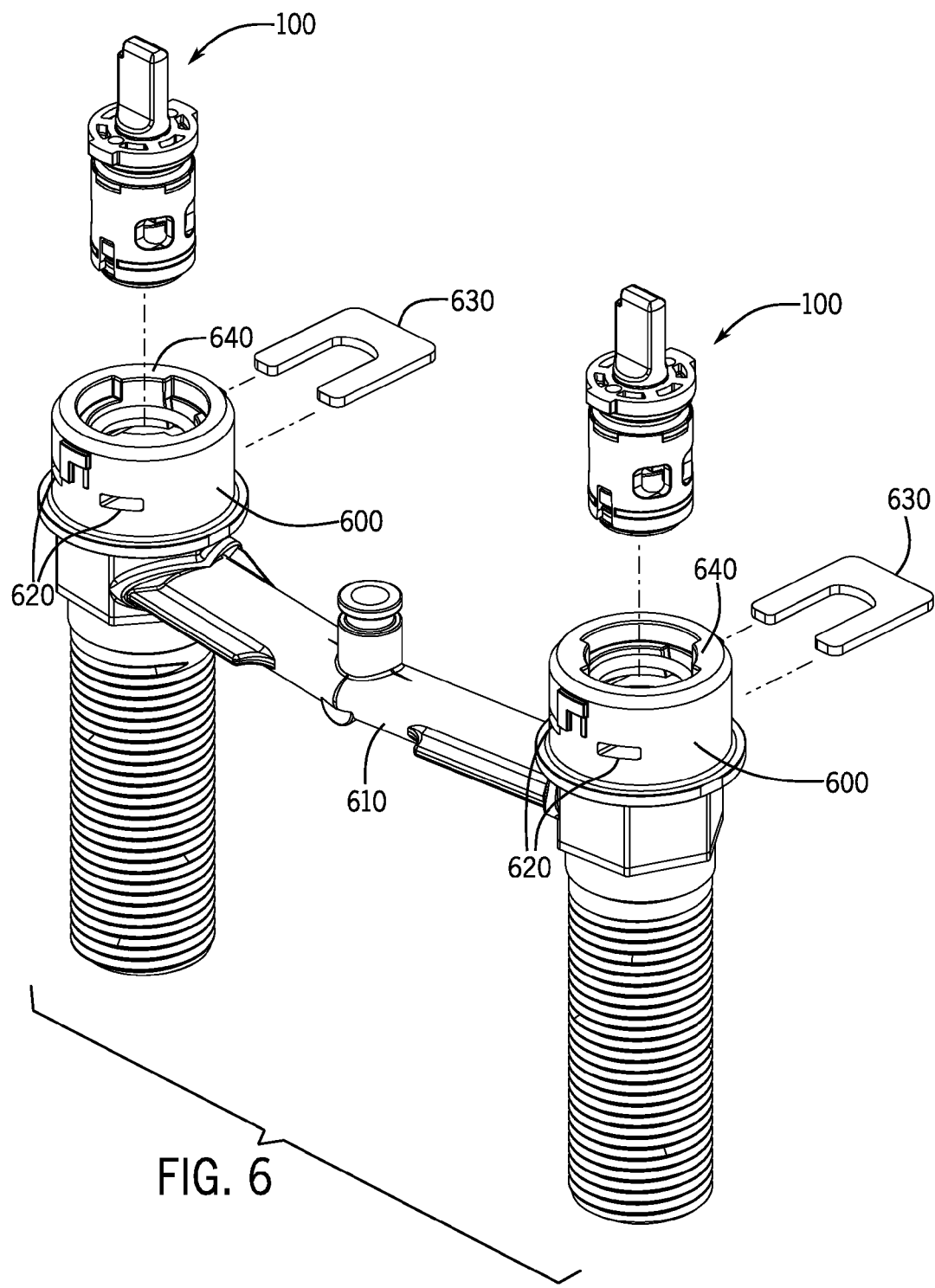
FIG. 6 is a perspective exploded view of a faucet subassembly including, among other elements, two of the valves shown in FIG. 1, according to an exemplary embodiment of the present disclosure.

As shown in FIG. 6, a pair of centerset valves 100 are installed in respective yokes (e.g., valve bodies, etc.), shown as centerset yokes 600. According to the exemplary embodiment shown, centerset yokes 600 are fluidly and structurally connected by a connector, shown as waterway connector 610. In these embodiments, centerset valves 100 are side discharge valves. As shown in FIG. 6, each of the centerset yokes 600 include a plurality of slots, shown as slots 620. According to various embodiments, centerset valves 100 are retained in centerset yokes 600 through the use of a retainer, shown as retaining element 630, that is configured to be inserted through slots 620 in centerset yoke 600 to secure centerset valves 100 within centerset yokes 600. While slots 620 may not be explicitly shown in all FIGURES, it is understood that slots 620 may be incorporated within centerset yoke 600 in various faucet assemblies. Slots 620 may have various shapes, sizes, and configurations such that the interaction between centerset yoke 600, slots 620, retaining element 630, and centerset valve 100 retains centerset valve 100 within centerset yoke 600. In some embodiments, centerset yoke 600 includes a circumferential groove disposed coplanar to slots 620, such that retaining element 630 may be received in the circumferential groove. According to various embodiments, centerset yokes 600 include an opening, shown as longitudinal opening 640, configured to receive centerset valves 100 therein. The centerset valve 100 can be inserted into the longitudinal opening 640 without the need to threadably couple the centerset valve 100 to the centerset yoke 600. In this way, the centerset valve 100 does not need external threads to couple the centerset valve 100 to the centerset yoke 600, thereby reducing part complexity and cost.

Figure 7:
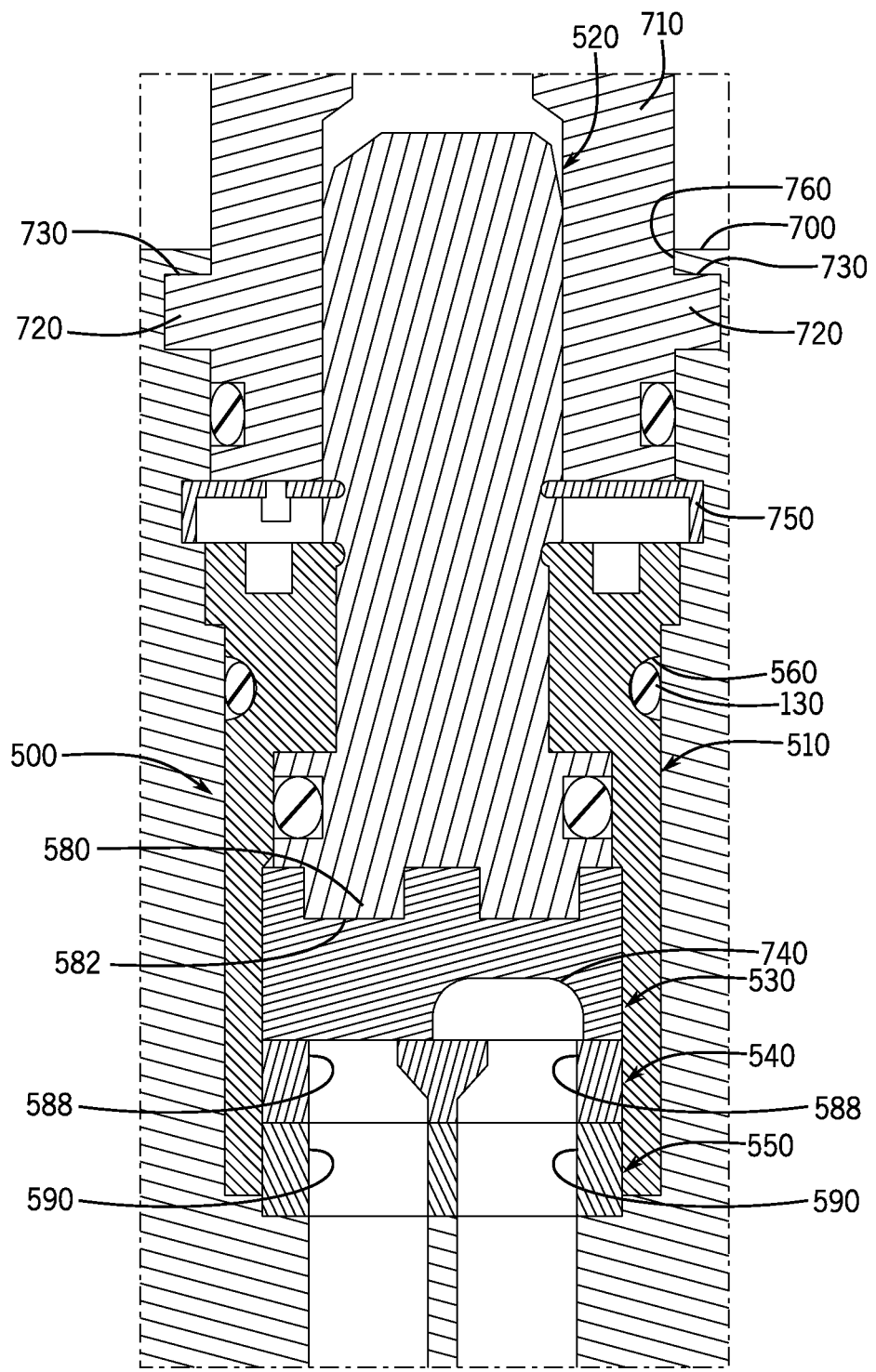
FIG. 7 is a cross-sectional view of the valve shown in FIG. 5 installed within a faucet assembly, according to an exemplary embodiment of the present disclosure.

Referring to FIG. 7, widespread valve 500 is mounted within a yoke (e.g., valve body, etc.), shown as widespread yoke 700, and coupled to an adaptor, shown as widespread handle adaptor 710. Widespread handle adaptor 710 may include a plurality of tabs, shown as end stops 720, configured to be received within a corresponding number of channels, shown as end stop receiving channels 730, located within widespread yoke 700. The end stops 720 are configured to rotatably couple the widespread handle adaptor 710 to the widespread yoke 700. In some embodiments, moveable disc 530 of widespread valve 500 may include a recess, shown as recess 740. Rotation of moveable disc 530, caused by rotation of stem 520, results in rotation of recess 740. In the open position, recess 740 provides a fluid pathway through apertures 588 of first stationary disc 540, apertures 590 of second stationary disc 550, and recess 740 of moveable disc 530. In the closed position, recess 740 does not provide a fluid pathway through apertures 588 of first stationary disc 540, apertures 590 of second stationary disc 550, and recess 740 of moveable disc 530. In the open position, recess 740 may be positioned over a portion of each of apertures 588 of first stationary disc 540 and apertures 590 of second stationary disc 550. In the closed position, recess 740 may not be positioned over a portion of each of apertures 588 of first stationary disc 540 and apertures 590 of second stationary disc 550.

End stops 720 and end stop receiving channels 730 are configured to define an angular travel of stem 520. In other words, the end stops 720 and the end stop receiving channels 730 cooperatively define the end points of rotation for the fluid control valve. The desired angular travel of stem 520 may be equal to the angular spacing between apertures 588 on first stationary disc 540 and/or apertures 590 on second stationary disc 550. According to an exemplary embodiment, end stops 720 are angularly spaced such that one end stop 720 is angularly offset one-hundred and eighty degrees from another end stop 720 (i.e., diametrically opposed). Such an angular spacing may allow stem 520 to have an angular travel of ninety degrees between a proximate pair of end stops 720. End stops 720 of widespread handle adaptor 710 may be disposed an angular distance apart corresponding to the desired angular travel of stem 520 and the placement of the end stops. In some embodiments, widespread valve 500 is a plug valve that may be substantially smaller in size and height than a typical valve due to exclusion of internal valve stops within widespread valve 500, thereby allowing for greater aesthetic design flexibility and ease of assembly. Additionally, packaging for widespread valve 500 may be of a smaller size. Further, in some embodiments, widespread valve 500 requires fewer components to assemble compared to typical valve assemblies including internal stop mechanisms/features.

According to various exemplary embodiments, widespread valve 500 is retained in widespread yoke 700 through the use of a clip (e.g., retainer, retaining element, pin, sheet, etc.), shown as retaining element 750. In various embodiments, widespread valve 500 is biased in a axial direction (i.e., upwards), relative to the incoming supply of water (where the supply of water into widespread valve 500 is defined as flowing up, and the supply of water out of widespread valve 500 is defined as flowing down), by the forces provided by the interaction of the supply of water (i.e., water supply pressure) with widespread valve 500. When considering a case where widespread valve 500 is installed within widespread yoke 700 and coupled thereto through the use of retaining element 750, retaining element 750 may provide an opposing force to the force provided by the interaction of the supply of water (i.e., water supply pressure) and widespread valve 500. According to various embodiments, the distance from the top side of retaining element 750 and the bottom side of widespread valve 500, relative to the incoming supply of water (where the supply of water into widespread valve 500 is defined as flowing up, and the supply of water out of widespread valve 500 is defined as flowing down), is sufficient to allow an upward force on widespread valve 500 from the water supply pressure when widespread valve 500 and retaining element 750 are installed within widespread yoke 700, such that retaining element 750 retains widespread valve 500 in a longitudinal direction within widespread yoke 700. In other words, the retaining element 750 and the water supply pressure cooperate to maintain or limit the longitudinal or axial movement of widespread valve 500 relative to the widespread yoke 700. According to various embodiments, widespread yoke 700 includes an opening, shown as longitudinal opening 760, configured to receive widespread valve 500 therein.

In some embodiments, retaining element 750 is inserted through slots within widespread yoke 700 to retain widespread valve 500 within widespread yoke 700. In place of or in addition to retaining element 750, widespread valve 500 may be coupled within widespread yoke 700 through the use of a cap ultrasonically welded to body 510. In this example, both the cap and body 510 must be constructed out of a compatible plastic material capable of being ultrasonically welded. The cap may be ultrasonically welded within or on top of the opening of widespread yoke 700 in confronting relation with widespread valve 500. In addition to or in place of the previously mentioned methods of retaining widespread valve 500 within widespread yoke 700, body 510 may contain external threads which may be configured to accept a retaining nut used to secure widespread valve 500 within widespread yoke 700. According to various embodiments, widespread valve 500 is installed within widespread yoke 700 such that no threaded connection between widespread valve 500 and widespread yoke 700 exists.

Figure 8:
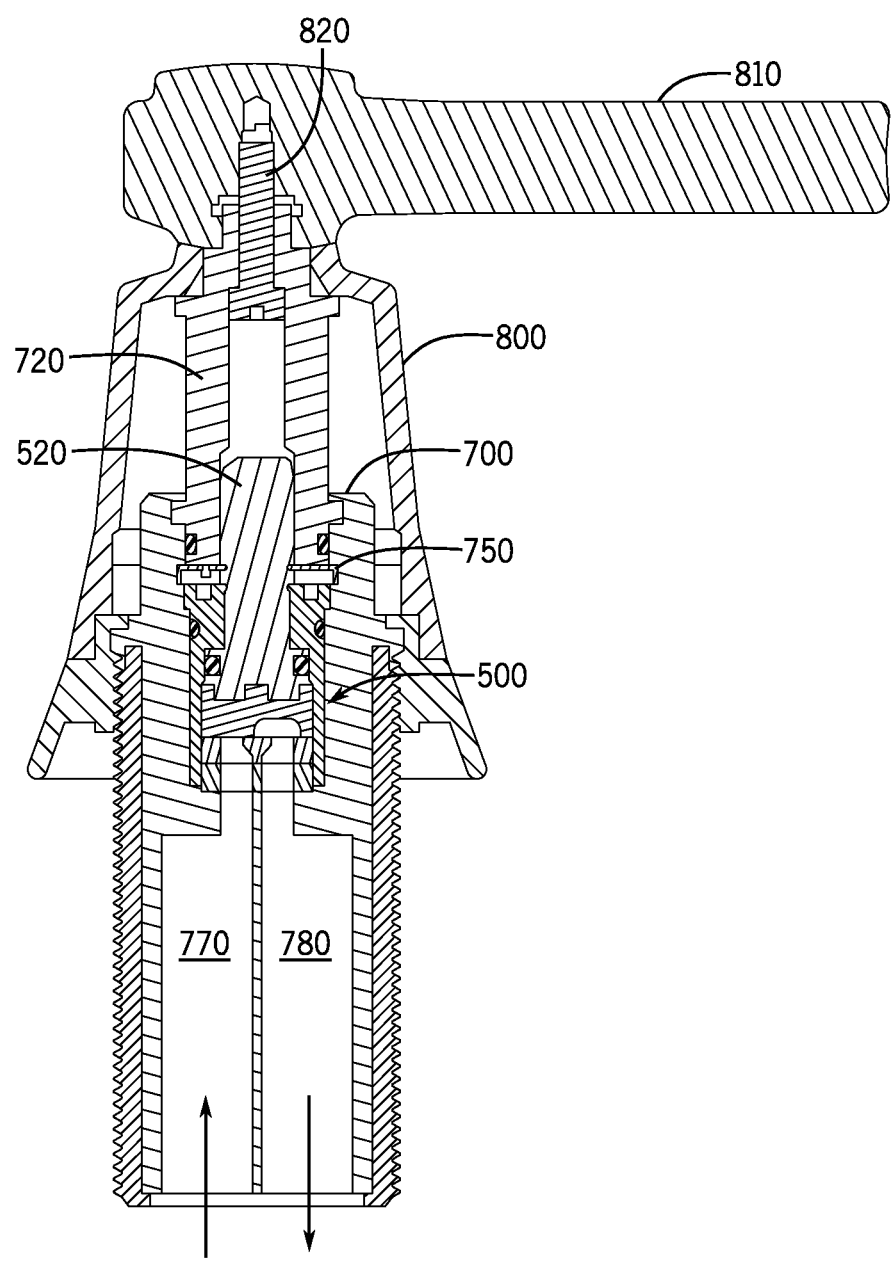
FIG. 8 is another cross-sectional view of the valve shown in FIG. 5 installed within a faucet assembly, according to an exemplary embodiment of the present disclosure.

As shown in FIGS. 7-8, widespread yoke 700 may include a first channel, shown as first channel 770, and a second channel, shown as second channel 780, for use with a bottom discharge valve. According to an exemplary embodiment, a supply of water is configured to enter widespread valve 500 from first channel 770 and the supply of water is configured to exit widespread valve 500 from second channel 780. It is understood that first channel 770 may be configured to receive fluid from widespread valve 500, and similarly that second channel 780 may be configured to transmit fluid to widespread valve 500, such that widespread yoke 700 may be tailored for a target application.

According to various exemplary embodiments, the installation of widespread valve 500 within widespread yoke 700 and widespread handle adaptor 710 does not require the use of a wear washer or a stem o-ring, as is required in typical valve assemblies. Exclusion of the wear washer and stem o-ring from widespread valve 500 facilitates a reduction in manufacturing time and decreases the cost to assemble widespread valve 500.

As shown in FIG. 8, widespread valve 500 may be coupled to a bonnet, shown as bonnet 800, and further coupled to handles, shown as handles 810. In some embodiments, bonnet 800 is coupled to widespread yoke 700 through a threaded interface. In other embodiments, bonnet 800 is coupled to widespread yoke 700 through a down, snap, and turn mechanism. For example, widespread yoke 700 may have a snap profile configured to mate with locking mechanisms disposed on an inner ring within bonnet 800. According to various embodiments, widespread handle adaptor 710 is coupled to handle 810 through the use of a post, shown as post 820. In these embodiments, post 820 is coupled to widespread handle adaptor 710 and to handle 810.

Figure 9:
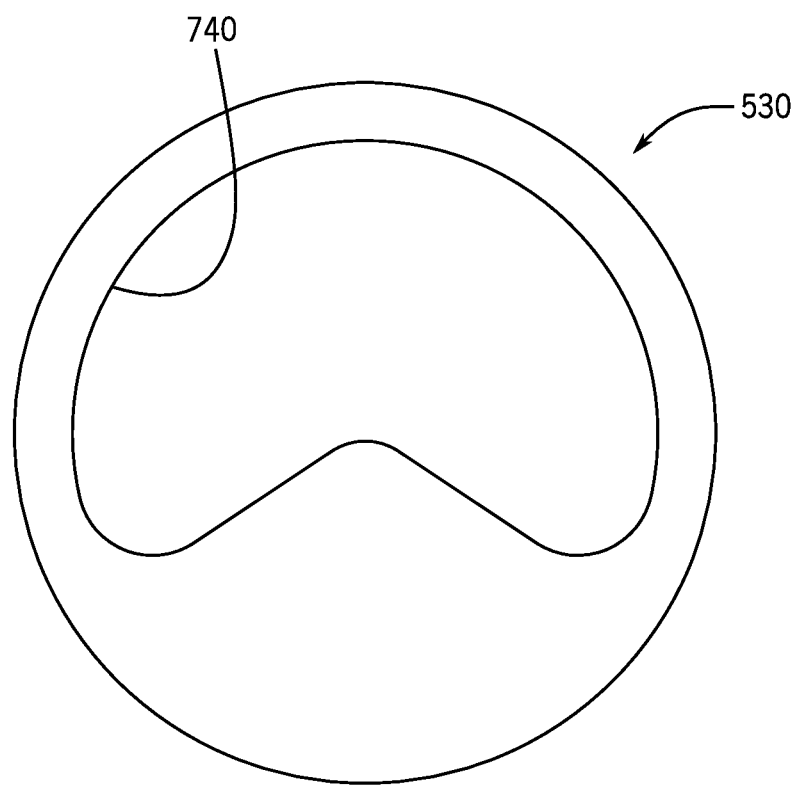
FIG. 9 is a top view of a disc for use within the valve shown in FIG. 5, according to an exemplary embodiment of the present disclosure.
Figure 10:
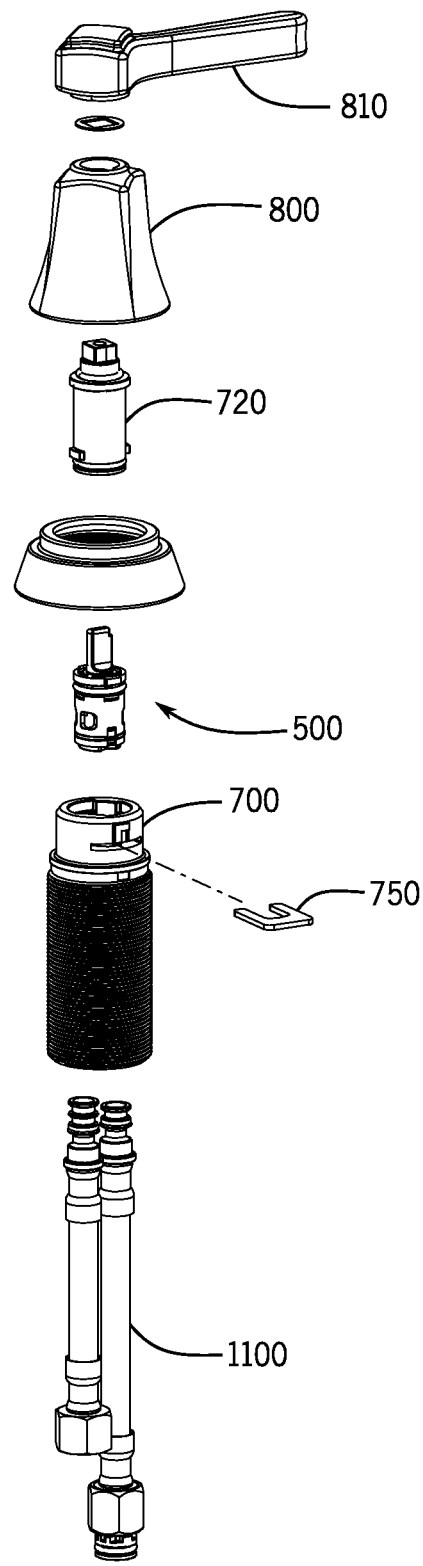
FIG. 10 is a perspective exploded view of a faucet subassembly for one handle including, among other elements, the valve shown in FIG. 5, according to an exemplary embodiment of the present disclosure.

Referring now to FIG. 9, moveable disc 530 is shown to include recess 740. Recess 740 may be substantially circular shaped except for a sector of moveable disc 530 which is not included within recess 740. In application, moveable disc 530 may be responsible for metering and control of the temperature and flow rate of various water supplies through widespread valve 500. In operation, rotation of stem 520 may cause rotation of moveable disc 530. Moveable disc 530 is operable between an open position, where a supply of water is facilitated through widespread valve 500, and a closed position, where the supply of water is prohibited through widespread valve 500. The open position is defined as the point where at least a portion of recess 740 is positioned over apertures 588 of first stationary disc 540 and apertures 590 of second stationary disc 550. The closed position is defined as the point where at least a portion of recess 740 is not positioned over apertures 588 of first stationary disc 540 and apertures 590 of second stationary disc 550. Accordingly, the shape and size of recess 740 is an important factor in the flow of the supply of water through widespread valve 500. In some embodiments, the supply of water is intended to be contained within recess 740 such that the supply of water does not leak from moveable disc 530 to body 510 and/or stem 520. While recess 740 is shown in one configuration in FIG. 9, it is understood that variations of recess 740 in terms of shape, size, depth, and other similar factors could be employed such that moveable disc 530 may be tailored for a target application. In operation, moveable disc 530 may provide a more consistent transition from a cold supply of water to a hot supply of water through widespread valve 500 than a disc in a conventional valve. As shown in FIG. 10, a plumbing network, shown as plumbing network 1100, is coupled to widespread yoke 700. Plumbing network 1100 may be configured to provide a supply of water to widespread valve 500 and an outlet from widespread valve 500. In these embodiments, widespread valve 500 is a bottom discharge valve.

Figure 11:
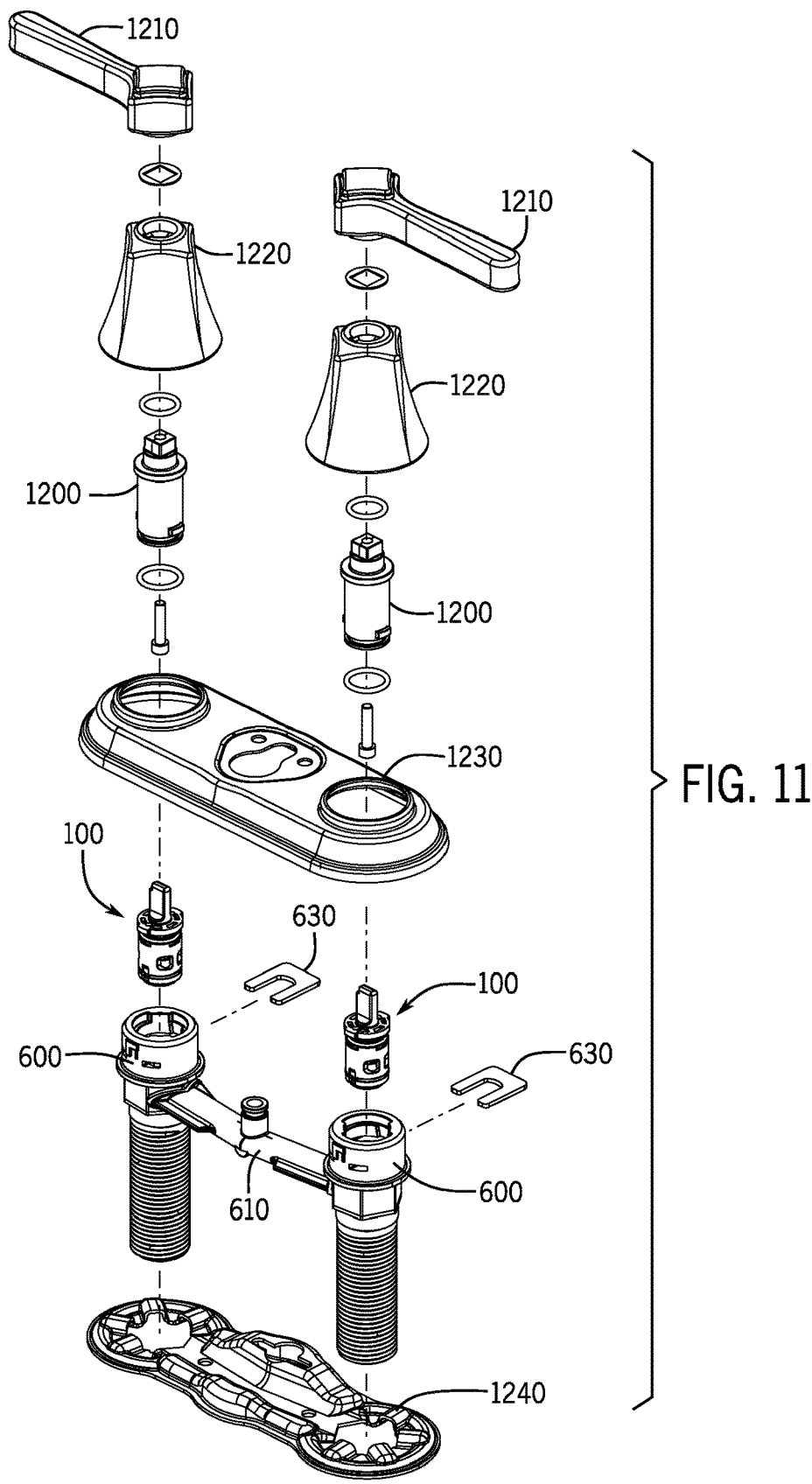
FIG. 11 is a perspective exploded view of a faucet subassembly, including, among other elements, two of the valves shown in FIG. 1, according to an exemplary embodiment of the present disclosure.
Figure 12:
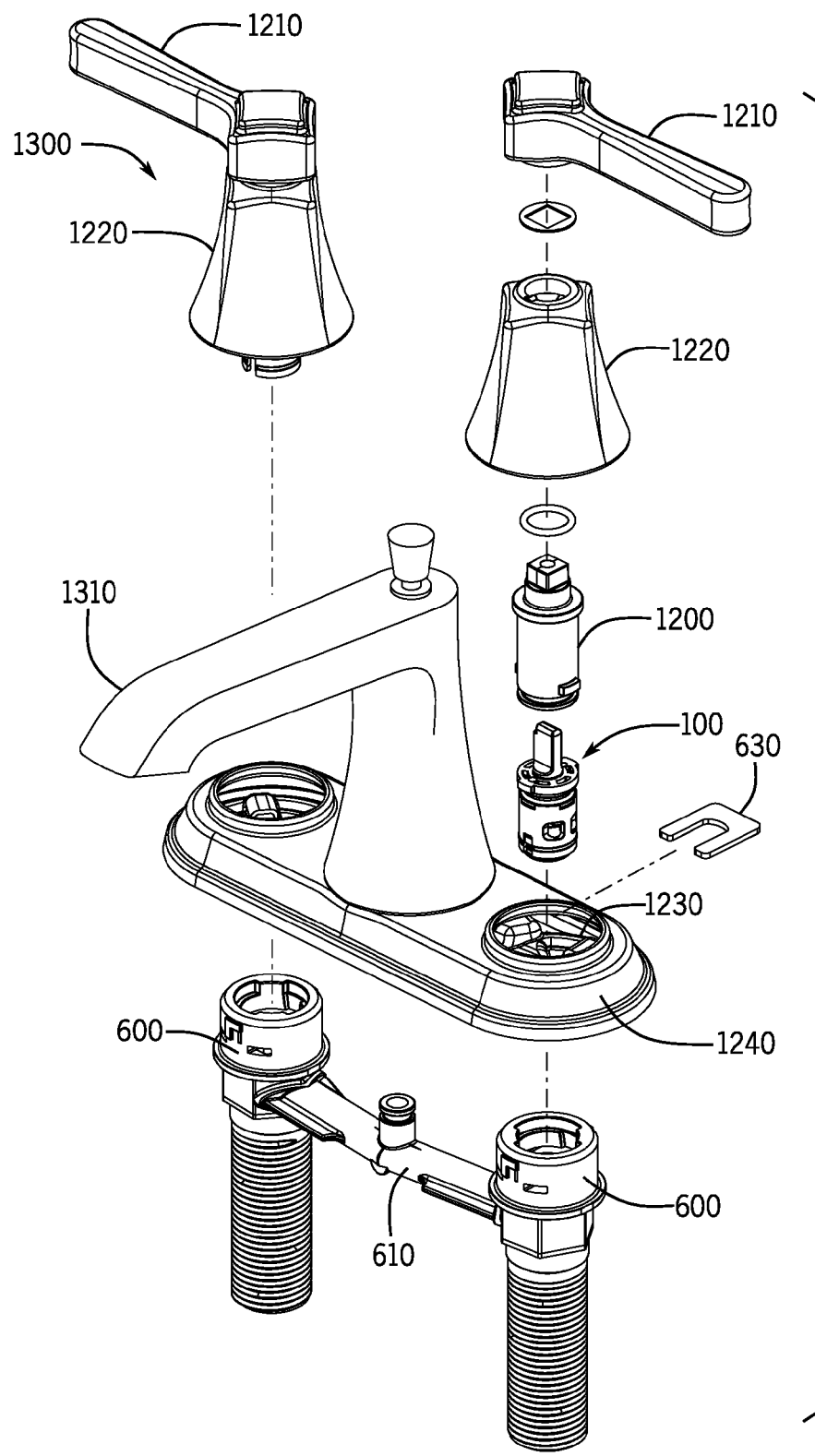
FIG. 12 is a perspective exploded view of a faucet assembly, including, among other elements, the valve shown in FIG. 1, according to an exemplary embodiment of the present disclosure.

FIGS. 11-12 illustrate various partial exploded views of centerset valve 100 installed within various components of a faucet assembly. As shown in FIG. 11, waterway connector 610 is provided between individual centerset yokes 600 such that a side discharge valve, such as centerset valve 100, may be incorporated in a faucet assembly. In various embodiments, centerset yoke 600 includes a plurality of slots.

According to an exemplary embodiment, centerset valve 100 is configured to be mounted within a handle adaptor, shown as centerset handle adaptor 1200. Centerset handle adaptor 1200 may include a plurality of tabs configured to travel within channels of the faucet assembly. These tabs and channels may be similar to end stops 720 and end stop receiving channels 730. These tabs and channels may be configured to define an angular travel of stem 120. The desired angular travel of stem 120 may be equal to the angular spacing between the apertures 330 on stationary disc 150. According to an exemplary embodiment, the tabs are angularly spaced such that one tab is angularly offset one-hundred and eighty degrees from another tab (i.e., diametrically opposed). Such an angular spacing may allow stem 120 to have an angular travel of ninety degrees. In some embodiments, centerset valve 100 is a plug valve that may be substantially smaller in size and height than a typical valve due to exclusion of internal valve stops within centerset valve 100, thereby allowing for greater aesthetic design flexibility and ease of assembly. Additionally, packaging for centerset valve 100 may be of a smaller size. Further, in some embodiments, centerset valve 100 requires fewer components to assemble compared to typical valve assemblies.

In some embodiments, reversible valve seal 160 provides an interference compression force configured to assist in securing centerset valve 100 within centerset yoke 600. In addition, reversible valve seal 160 may provide a proper height stack nest necessary for using retaining element 630 to retain centerset valve 100 within centerset yoke 600 (e.g., to limit the longitudinal or axial movement of centerset valve 100 relative to centerset yoke 600).

According to various exemplary embodiments, the installation of centerset valve 100 within centerset yoke 600 and centerset handle adaptor 1200 does not require the use of a wear washer or a stem o-ring, as is required in typical valve assemblies. Exclusion of the wear washer and stem o-ring from centerset valve 100 facilitates a reduction in manufacturing time and decreases the cost to assemble centerset valve 100.

Figure 13:
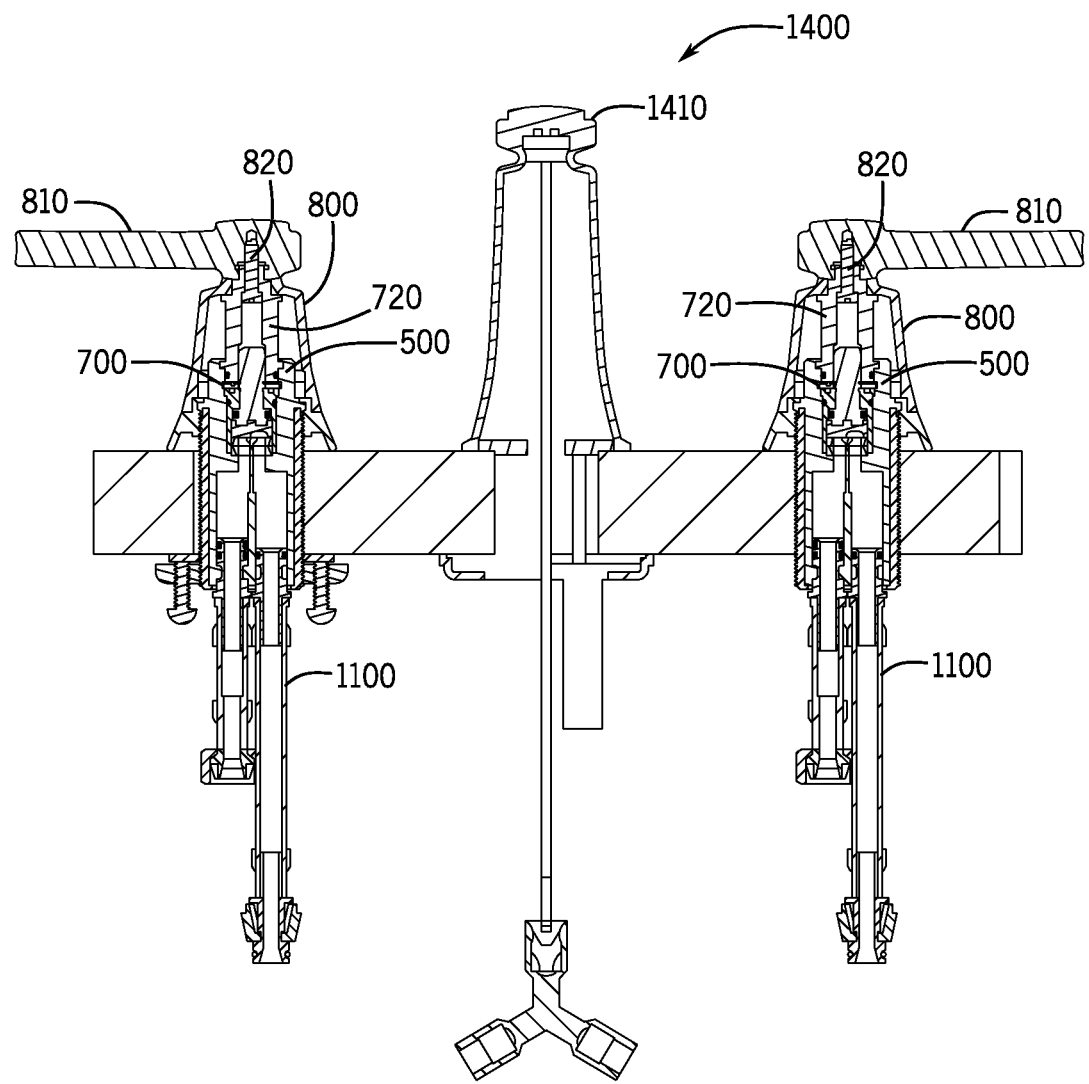
FIG. 13 is a perspective exploded view of a faucet assembly, including, among other elements, two of the valves shown in FIG. 5, according to an exemplary embodiment of the present disclosure.

As shown in FIG. 11, the faucet assembly includes centerset valves 100, centerset yoke 600, waterway connector 610, retaining element 630, handles, shown as handles 1210, centerset handle adaptors 1200, bonnets, shown as bonnets 1220, a plate, shown as escutcheon plate 1230, and a plate, shown as yoke plate 1240. Referring to FIG. 13, a faucet assembly, shown as centerset faucet assembly 1300, includes centerset valve 100, centerset yokes 600, waterway connector 610, retaining element 630, centerset handle adaptor 1200, handles 1210, bonnets 1220, escutcheon plate 1230, yoke plate 1240, and a faucet, shown as faucet 1310.

Figure 14:
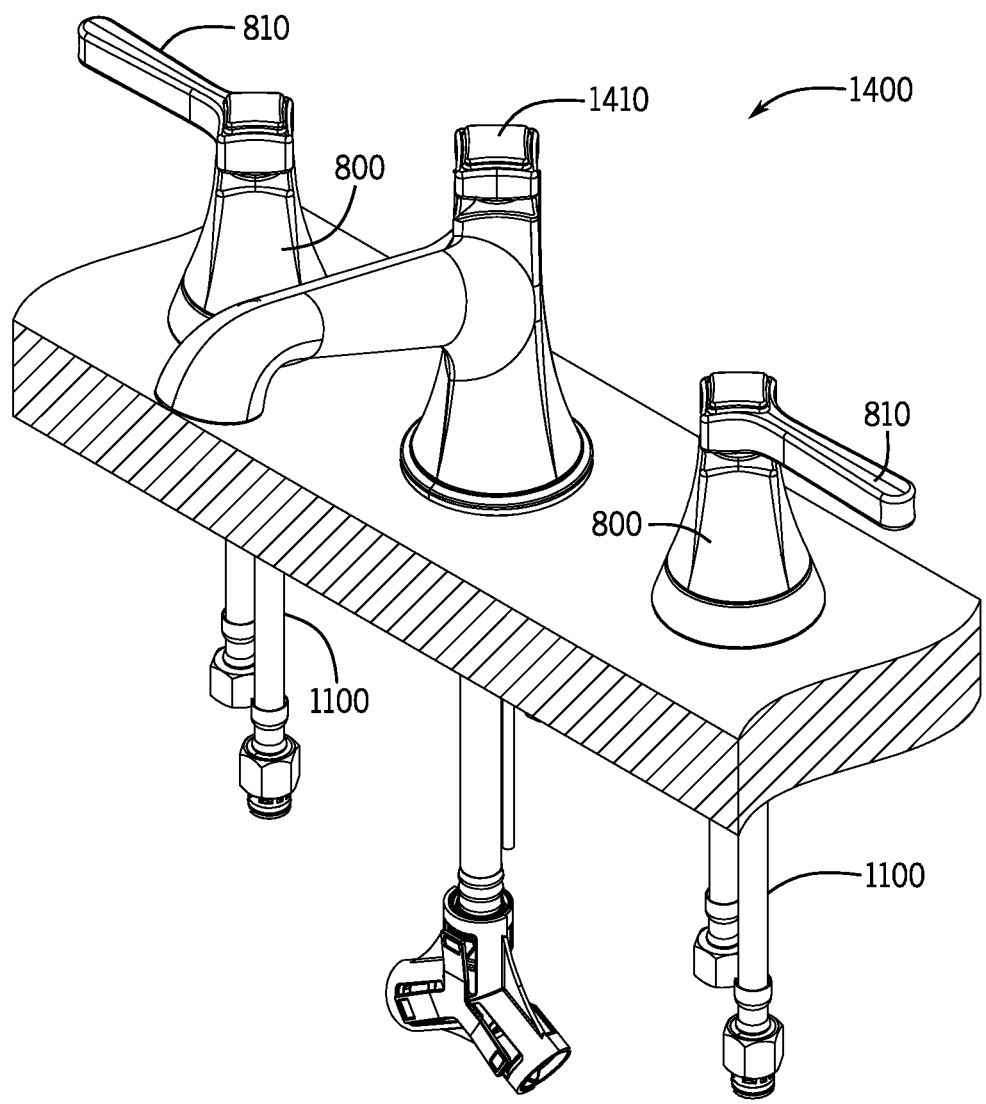
FIG. 14 is a perspective view of the faucet assembly shown in FIG. 13.

Referring to FIGS. 13-14, a cross-sectional view of a faucet assembly, shown as widespread faucet assembly 1400, is shown according to another exemplary embodiment. In some embodiments, widespread faucet assembly 1400 includes widespread valves 500, widespread yokes 700, widespread handle adaptors 710, retaining elements 750, bonnets 800, handles 810, plumbing network 1100, and a faucet, shown as faucet 1410. As shown in FIGS. 13-15, widespread faucet assembly 1400 may be mounted to a surface, shown as mounting surface 1420.

While in various embodiments, body 110, stem 120, seal 130, seal 350, moveable disc 140, stationary disc 150, reversible valve seal 160, centerset valve 100, centerset yoke 600, waterway connector 610, retaining element 630, centerset handle adaptors 1200, handles 1210, bonnets 1220, escutcheon plate 1230, yoke plate 1240, faucet 1310, have been described as components of centerset faucet assembly 1300, it is understood that all components of centerset faucet assembly 1300 can similarly be implemented in widespread faucet assembly 1400, such that widespread faucet assembly 1400 may be tailored for a target application.

Similarly, while in various embodiments, widespread valve 500, body 510, stem 520, moveable disc 530, first stationary disc 540, second stationary disc 550, widespread yoke 700, widespread handle adaptor 710, end stops 720, retaining element 750, bonnet 800, handles 810, post 820, yoke plate 900, plumbing network 1100, mounting surface 1420, have been described as components of widespread faucet assembly 1400, it is understood that all components of widespread faucet assembly 1400 can similarly be implemented in centerset faucet assembly 1300, such that centerset faucet assembly 1300 may be tailored for a target application.

It is further understood that the description of similar components herein applies to all similar components. For example, it is understood that the description of bonnets 800 similarly applies to bonnets 1220. It is within the spirit of the invention for various components as described and shown in relation to one of centerset faucet assembly 1300 and widespread faucet assembly 1400 to be similarly incorporated into the other of centerset faucet assembly 1300 and widespread faucet assembly 1400.

Retaining element 630 and retaining element 750 may be constructed in various configurations and of various materials such that retaining element 750 may be tailored for a target application. In one embodiment, retaining element 750 has a central slot sized to accept stem 520. Body 110, stem 120, seal 130, seal 350, moveable disc 140, stationary disc 150, retaining element 630, body 510, moveable disc 530, first stationary disc 540, second stationary disc 550, and retaining element 750 may be constructed of various materials such as brass, aluminum, polymeric material, thermoset, polymeric based blend, polymer, nylon, rubber, synthetic rubber, polyvinyl chloride, polytetrafluoroethylene, ceramic, ceramic blend, ceramic-metallic blend, alumina, metallic blend, zinc, alloy, brass, aluminum, steel, or any other suitable material such that widespread valve 500 may be tailored for a target application. Further, body 110, stem 120, seal 130, seal 350, moveable disc 140, stationary disc 150, retaining element 630, body 510, moveable disc 530, first stationary disc 540, second stationary disc 550, and retaining element 750 may have various surface finishes, porosities, grain sizes, intergranular phase and chemical properties, purities, wear resistance, shock resistance, flatness, surface roughness, bear ratios, have rounded or corned edges, or any other suitable properties such that centerset valve 100 and/or widespread valve 500 may be tailored for a target application.

In an exemplary embodiment, stem 120 and/or stem 520 are constructed of a plastic material such as a polymeric material, thermoset, polymeric based blend, polymer, nylon, rubber, synthetic rubber, polyvinyl chloride, polytetrafluoroethylene, or any other suitable plastic material such that centerset valve 100 and/or widespread valve 500 may be tailored for a target application. However, in alternative embodiments, stem 120 and/or stem 520 are constructed of brass, metallic blend, zinc alloy, aluminum, steel, or any other suitable material such that centerset valve 100 and/or widespread valve 500 may be tailored for a target application.

According to various embodiments, centerset valve 100 and/or widespread valve 500 may be utilized in various faucet assemblies such as mono-block lavatory faucets, bridge style kitchen faucets, bathfill faucets, and other suitable types of faucets such that the faucet assembly may be tailored for a target application.

One embodiment of the present disclosure relates to a valve cartridge including a cylindrical body, a stem, and a reversible valve seal. The stem is disposed within the body and configured to freely rotate relative to the body a full three-hundred and sixty degrees. The reversible valve seal is coupled to a bottom portion of the body. The valve is coupled to a yoke through the use of a retaining element. The yoke includes a number of slots through which the retaining element is inserted. The yoke includes a circumferential groove disposed on the interior of the yoke and coplanar with the slots that is configured to accept the retaining element. The retaining element limits the upward movement of the valve within the yoke. The overall height of the valve is such that when a supply of water is received within the valve, the valve is biased upward against the retaining element to retain the valve in a longitudinal direction within the yoke.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

While centerset valve 100 and widespread valve 500 have been referenced to control a supply of water, it is understood that other similar fluids could be controlled through the use of centerset valve 100 and/or widespread valve 500.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present application.

What is claimed is:

1. A fluid control valve comprising,
a body;
a stem rotatably coupled to the body, wherein the stem is configured to freely rotate three hundred and sixty degrees relative to the body;
a moveable disc coupled to the stem, wherein the moveable disc is configured to rotate with the stem;
a first stationary disc coupled to the body below the moveable disc; and
a second stationary disc coupled to the body below the first stationary disc;
wherein the first and second stationary discs are fixed relative to the body;
wherein the fluid control valve is configured to be biased in an axial direction within a valve body by an incoming supply of fluid through the first stationary disc and the second stationary disc;

wherein the first stationary disc includes one or more apertures disposed therein; and wherein the second stationary disc includes one or more apertures disposed therein, and wherein the one or more apertures of the first stationary disc are substantially aligned with the respective one or more apertures of the second stationary disc.

2. The fluid control valve of claim 1, further comprising a seal disposed around the stem, wherein the seal is configured to engage an inner portion of the body.

3. The fluid control valve of claim 1, further comprising a seal disposed around an outer portion of the body, wherein the seal is configured to engage the valve body.

4. The fluid control valve of claim 1, wherein the stem includes a protrusion, and wherein the moveable disc includes a receiving channel configured to receive the protrusion such that rotation of the stem results in corresponding rotation of the moveable disc.

5. The fluid control valve of claim 1, wherein the body does not include any external threads.

6. The fluid control valve of claim 1, wherein the fluid control valve is a bottom discharge valve.

7. The fluid control valve of claim 1, wherein the moveable disc includes a recess for receiving a supply of fluid therein, and wherein the moveable disc is configured to prevent the supply of fluid from flowing through the moveable disc to the body and the stem.

8. The fluid control valve of claim 1, wherein the body includes one or more slots, and wherein each of the first and second stationary discs includes one or more tabs configured to be received within the respective one or more slots such that the first and second stationary discs are fixed relative to the body.

9. The fluid control valve of claim 1, wherein the stem is made from a polymeric material.

10. A fluid control valve comprising,
a body;
a stem rotatably coupled to the body, wherein the stem is configured to freely rotate three hundred and sixty degrees relative to the body;
a moveable disc coupled to the stem, wherein the moveable disc is configured to rotate with the stem;
a first stationary disc coupled to the body below the moveable disc; and
a second stationary disc coupled to the body below the first stationary disc;
wherein the fluid control valve is configured to be biased in an axial direction within a valve body by an incoming supply of fluid through the first stationary disc and the second stationary disc; and
wherein the body includes one or more slots, and wherein each of the first and second stationary discs includes one or more tabs configured to be received within the respective one or more slots such that the first and second stationary discs are fixed relative to the body.

11. The fluid control valve of claim 10, wherein the body does not include any external threads.

12. The fluid control valve of claim 10, wherein the fluid control valve is a bottom discharge valve.

13. The fluid control valve of claim 10, wherein the moveable disc includes a recess for receiving a supply of fluid therein, and wherein the moveable disc is configured to prevent the supply of fluid from flowing through the moveable disc to the body and the stem.

14. The fluid control valve of claim 10, wherein the first stationary disc includes one or more apertures disposed therein.

15. The fluid control valve of claim 10, further comprising a seal disposed around the stem, wherein the seal is configured to engage an inner portion of the body.

16. The fluid control valve of claim 10, further comprising a seal disposed around an outer portion of the body, wherein the seal is configured to engage the valve body.

17. The fluid control valve of claim 10, wherein the stem includes a protrusion, and wherein the moveable disc includes a receiving channel configured to receive the protrusion such that rotation of the stem results in corresponding rotation of the moveable disc.

18. The fluid control valve of claim 10, wherein the first stationary disc includes one or more apertures disposed therein, and wherein the second stationary disc includes one or more apertures disposed therein, and wherein the one or more apertures of the first stationary disc are substantially aligned with the respective one or more apertures of the second stationary disc.

19. The fluid control valve of claim 10, wherein the stem is made from a polymeric material.

20. A fluid control valve for a faucet, comprising:
a body including a slot;
a stem rotatably coupled to the body, wherein the stem is configured to freely rotate three hundred and sixty degrees relative to the body;
a moveable disc coupled to the stem, wherein the moveable disc is configured to rotate with the stem;
a first stationary disc coupled to the body below the moveable disc, wherein the first stationary disc includes an aperture; and
a second stationary disc coupled to the body below the first stationary disc, wherein the second stationary disc includes an aperture that is substantially aligned with the aperture of the first stationary disc;
wherein the fluid control valve is configured to be biased in an axial direction within a valve body by an incoming supply of fluid through the first stationary disc and the second stationary disc; and
wherein each of the first and second stationary discs includes a tab configured to be received within the slot of the body such that the first and second stationary discs are fixed relative to the body.

* * * * *